United States Patent [19]
Ueda

[11] Patent Number: 5,507,581
[45] Date of Patent: Apr. 16, 1996

[54] OUTPUT APPARATUS

[75] Inventor: Hiroyuki Ueda, Yokohama, Japan

[73] Assignee: Canon Kabushiki Kaisha, Tokyo, Japan

[21] Appl. No.: 320,428

[22] Filed: Oct. 6, 1994

Related U.S. Application Data

[63] Continuation of Ser. No. 931,409, Aug. 24, 1992, abandoned, which is a continuation of Ser. No. 508,286, Apr. 13, 1990, abandoned.

[30] Foreign Application Priority Data

Apr. 19, 1989 [JP] Japan ................................ 1-97564

[51] Int. Cl.$^6$ ........................................ B41J 5/00
[52] U.S. Cl. ........................ 400/61; 400/63; 400/70
[58] Field of Search ........................ 400/65, 61, 62, 400/63, 70, 76; 364/419.19; 375/115, 116, 117

[56] References Cited

U.S. PATENT DOCUMENTS

| | | | |
|---|---|---|---|
| 3,780,846 | 12/1973 | Kolpeck | 400/17 |
| 4,016,305 | 4/1977 | Staar | 400/63 |
| 4,558,965 | 12/1985 | Ueda. | |
| 4,615,631 | 10/1986 | Ueda. | |
| 4,725,158 | 2/1988 | Ueda. | |
| 4,735,515 | 4/1988 | Ueda. | |
| 4,786,894 | 11/1988 | Furusawa et al. | 400/63 |
| 4,809,220 | 2/1989 | Carlson | 400/63 |
| 4,810,121 | 3/1989 | Uneo et al. | 400/697.1 |
| 4,846,593 | 7/1989 | Ueda. | |
| 4,860,025 | 8/1989 | Berson et al. | 400/120 |
| 4,862,194 | 8/1989 | Uematsu | 400/63 |
| 4,875,174 | 10/1989 | Olodort et al. | 400/63 |
| 4,880,325 | 11/1989 | Ueda. | |
| 4,891,786 | 1/1990 | Goldwasser. | |
| 4,918,648 | 4/1990 | Taguchi et al. | 364/900 |
| 4,989,016 | 1/1991 | Gatten et al. | 400/17 |
| 5,037,223 | 8/1991 | Ueda. | |

*Primary Examiner*—John S. Hilten
*Attorney, Agent, or Firm*—Fitzpatrick, Cella, Harper & Scinto

[57] ABSTRACT

An output apparatus provided with an input unit for entering character information, a printing unit for printing the character information entered by the input unit, a memory unit for storing the character information entered by the input unit, and a selection unit for selecting a part of the character information printed by the printing unit, wherein the part, selected by the selection unit, of the character information can be re-printed by the printing unit.

24 Claims, 10 Drawing Sheets

FIG. 5

| | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
|    | ↵ | M | r | . | ] | H | i | r | o | ] | U | e | d | a | ↵ | T | o | k | y | o | ] |
| 21 | ↵ | a | p | a | n | a | n | ↵ | D | e | a | r | ] | M | r | . | ] | U | e | d | a |
| 42 | . | ↵ | T | h | a | n | k | ↵ | ] | y | o | u | ] | f | o | r | ] | ↵ |   |   |   |
|    | ↵ | — | — | ↵ | B | e | s | t | ] | r | e | g | a | r | d | s | . | ↵ | — | — | — |

25 → (position 3)

50

RAM1        3999

OUTPUT APPARATUS

This application is a continuation of application Ser. No. 07/931,409 filed on Aug. 24, 1992, now abandoned which is a continuation of application Ser. No. 07/508,286 filed Apr. 13, 1990, now abandoned.

BACKGROUND OF THE INVENTION

1. Field of the Invention

The present invention relates to an output apparatus such as an electronic typewriter or the like, and more particularly to such output apparatus having the function of printing a part of a text utilizing a memory for temporary storage.

2. Related Background Art

For example the conventional electronic typewriter employs a method of storing character codes in a memory corresponding to the already printed characters, and, in case of erasure (peeling off) of an already printed character, printing the same character again with an erasing ribbon, based on thus stored character code. The memory storing the character codes of already printed characters is called a correction buffer, and has a capacity of about 1,000 characters. The correction buffer always stores data of latest printed 1,000 characters, thus enabling correction within such latest 1,000 characters.

Also owing to the recent low price of memories, there are already known electronic typewriters capable of erasure up to about 4,000 characters, utilizing an increased memory capacity. The correction buffer for 4,000 characters corresponds to a correction buffer for a page. It is therefore possible to reprint an entire page with such correction buffer, and such reprinting function has become a standard function of the electronic typewriters.

However, in such conventional apparatus with a page correction buffer, it has not been possible to use a part of a text of a page for another purpose or to reprint such part of the text. For example it has not been possible to use the address part of a letter for printing the envelope, so that the address has to be typed anew on the envelope for each letter.

SUMMARY OF THE INVENTION

In consideration of the foregoing, an object of the present invention is to provide an output apparatus capable of improving the operability of the operator and of reprinting the text without mistakes.

Another object of the present invention is to provide an output apparatus comprising:

input means for entering at least a character information;

print means for printing said character information entered by the input means;

memory means for storing the character information entered by said input means; and selection means for selecting a part of the at least one character information printed by the print means;

wherein the part of said character information selected by the selection means is reprinted by the print means.

Still another object of the present invention is to provide an output apparatus comprising means for selecting the character information to be reprinted by the start point and the end point thereof and properly replacing the start point and end point by comparing the positional relationship thereof, thereby enabling to select the character information to be reprinted regardless of the positional relationship of the start point and end point.

Still another object of the present invention is to provide an output apparatus comprising means for registering selected character information to be reprinted, together with a registration number, in non-volatile memory means, thereby storing plural character information to be reprinted.

Still another object of the present invention is to provide an output apparatus capable of selecting the character information to be reprinted, on the text of printed character information.

Still another object of the present invention is to provide an output apparatus capable of printing a train of desired characters with ink.

BRIEF DESCRIPTION OF THE DRAWINGS

FIG. 5 is a view of the content of a correction buffer in the embodiment;

DETAILED DESCRIPTION OF THE PREFERRED EMBODIMENTS

Now the present invention will be clarified in detail by preferred embodiments thereof shown in the attached drawings.

Explanation of Structure (FIGS. 1 to 6)

Figure 1:
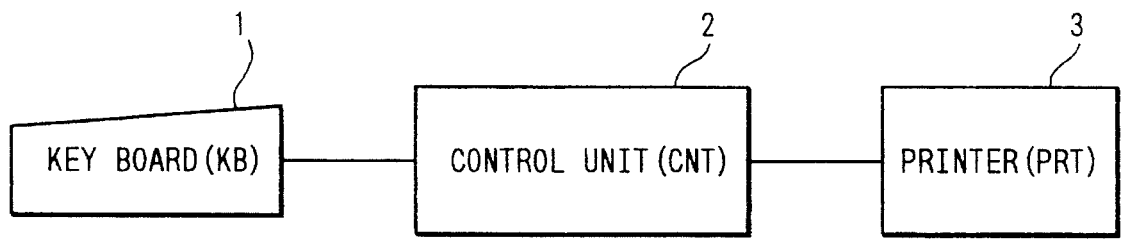
FIG. 1 is a schematic view of the structure of an electronic typewriter constituting an embodiment of the present invention.

FIG. 1 is a schematic view of the structure of an electronic typewriter constituting an embodiment of the present invention, wherein shown are a keyboard (KB) 1, a control unit (CNT) 2, and a printer (PRN) 3. In general, the key information entered from the keyboard 1 is transmitted to the control unit 2, which in response sends a command to the printer 3. In response to the command, the printer 3 performs printing or movement of a printing head.

Figure 2:
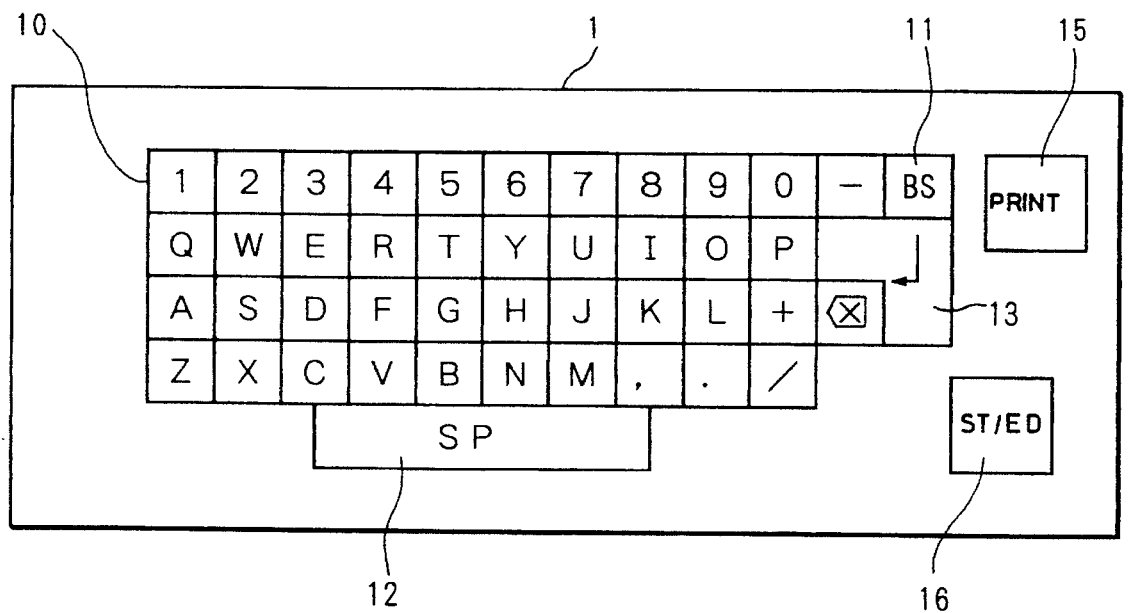
FIG. 2 is a view of a keyboard employed in the embodiment.

Now reference is made to FIG. 2 for explaining the keyboard 1 of the electronic typewriter of the present embodiment. As shown in FIG. 2, the keyboard 1 is provided with alphanumeric keys 10; a back space (BS) key 11; a space bar (SP) 12; a return key 13; a correction command key 14; a print key (PRINT) 15; and a start/end key (ST/ED)

16. The actuation of each of said keys 10–16 is detected in the following manner.

The actuated key can be identified by positioning key switches on the crossing points of a matrix circuit and scanning said matrix circuit with an electric signal. The information of the actuated key is sent to the control unit 2, in the form of a key code allotted to each key.

Figure 3:
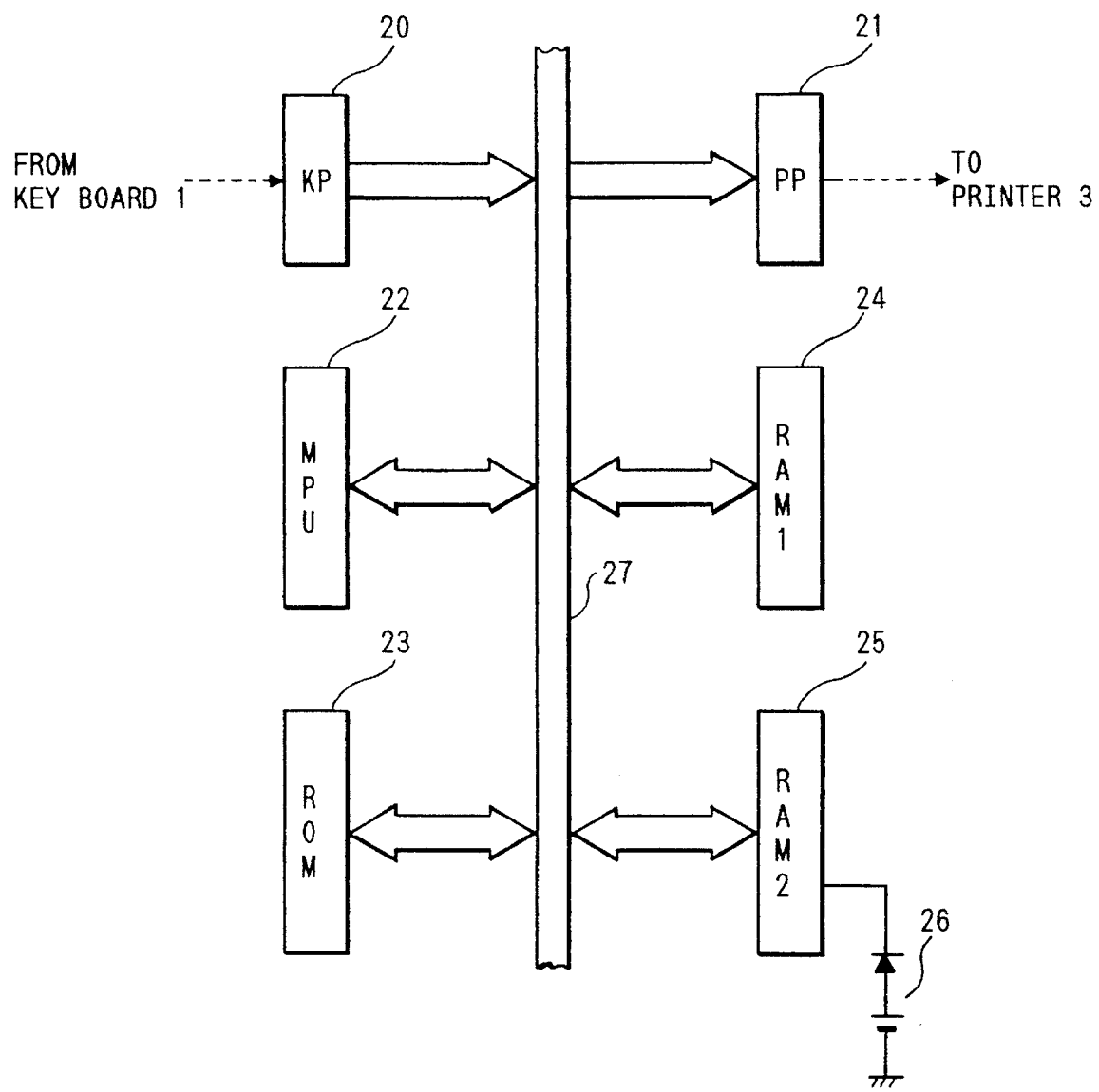
FIG. 3 is a block diagram of a control unit of the embodiment.

FIG. 3 is a block diagram schematically showing the structure of the control unit 2 mentioned above. There are provided a key port (KP) 20 for entering the key code from the keyboard 1; a printer port (PP) 21 for releasing a print command or a carriage movement command for effecting a printing operation in the printer 3 corresponding to the entered key code; a microprocessor (MPU) 22 for controlling the electronic typewriter according to a control sequence stored in a ROM 23 to be explained later; a read-only memory (ROM) 23 for storing control programs shown in FIGS. 7 to 9 and a program for sheet feeding control in case of using an ink jet printer to be explained later; a random access memory (RAM1) 24 including a work area to be used by the MPU 22 in the execution of said programs, a correction buffer shown in FIG. 5, and registers and flags shown in FIG. 6; and a random access memory (RAM2) 25 storing margins, tab data etc. in non-volatile manner by a back-up battery 26.

The above-mentioned devices 20–25 are connected with the MPU 22 through a data bus (DB) 27 for data exchange.

Figure 4:
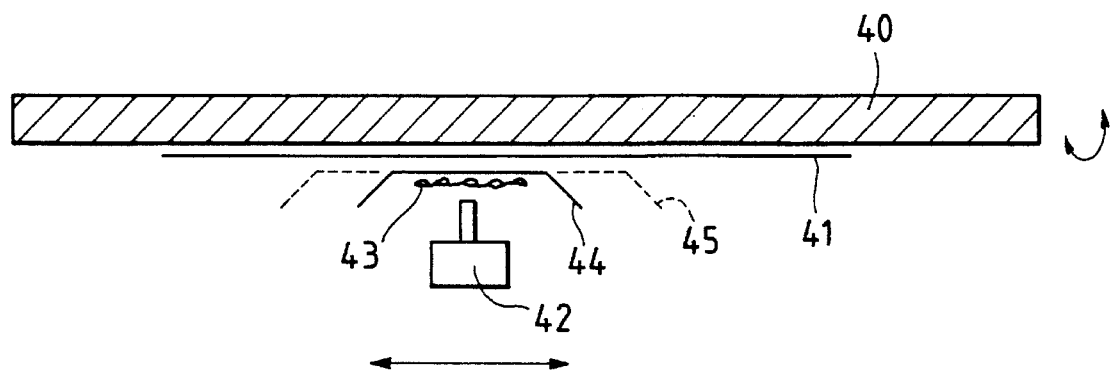
FIG. 4 is a schematic view of the structure of a printer employed in the embodiment.

Now reference is made to FIG. 4 for explaining the structure of the printer 3 employed in the present embodiment.

There are shown a platen 40; a printing sheet 41; a hammer 42; a daisy wheel 43; an ink ribbon 44; and a correction ribbon 45. The hammer 42, daisy wheel 43, ink ribbon 44 and correction ribbon 45 are mounted on a carriage (not shown). Consequently the front end of the hammer 42, or the print head, moves in a direction indicated by an arrow, together with the movement of the carriage. In response to a print command from the control unit 2, the printer 3 of the above-explained structure functions in the following manner.

At first the daisy wheel 43 is rotated to bring a desired type to the printing position. At the same time the ink ribbon 44 is advanced by an amount corresponding to a character, thereby preparing for the printing operation. Subsequently the hammer 42 is energized to press the type to the printing sheet 41 across the ink ribbon 44, whereby the ink of the ink ribbon 44 is transferred to the printing sheet 41 maintained in contact with the platen 40. In the correction (erasure or lifting off), the same type as the character to be erased hits the sheet across the correction ribbon 45 instead of the ink ribbon 44 mentioned above, whereby the ink is transferred again onto the correction ribbon 45.

The correction ribbon 45 has a sticky surface as in an adhesive tape.

The switching of the ink ribbon 44 and the correction ribbon 45 is conducted by vertical shifting of the ribbons.

In the printer 3 to be employed in the present invention, the platen 40 has to be rotatable in the forward and reverse direction, and this will facilitate the designation of the memory area as will be explained later.

Figure 6:
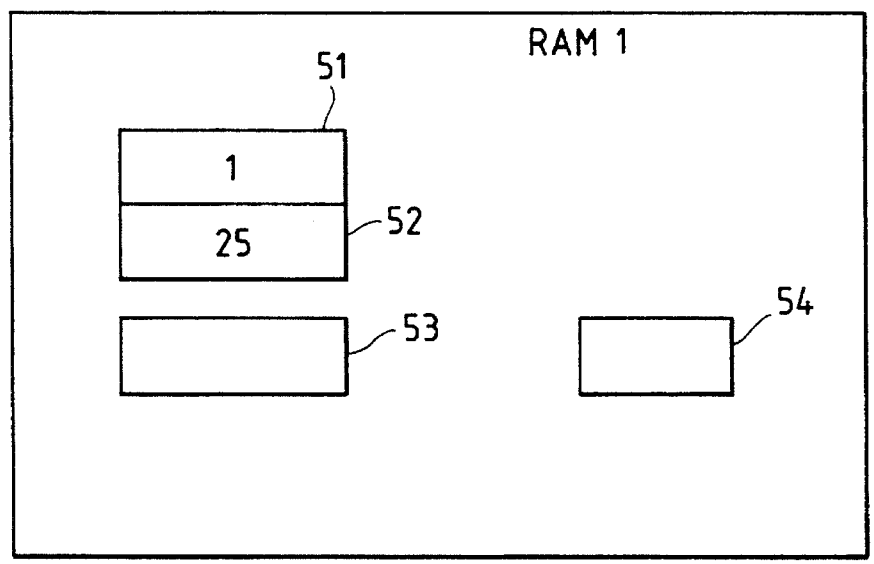
FIG. 6 is a view showing flags and pointers employed in the embodiment.

FIGS. 5 and 6 show the content of the RAM1 explained above.

There are shown a correction buffer 50 of 4,000 bytes; a start pointer 51 of 2 bytes; an end pointer 52 of 2 bytes; a buffer pointer 53 of 2 bytes; and a flag 54 of 1 byte. The correction buffer 50 has a continuous area of 4,000 bytes, having addresses from "0" to "3999". Each of the start pointer 51, end pointer 52 and buffer pointer 53 stores an address from "0" to "3999". The flag 54 assumes a value "0" or "1", for designating the start position or the end position as will be explained later.

Figure 7:
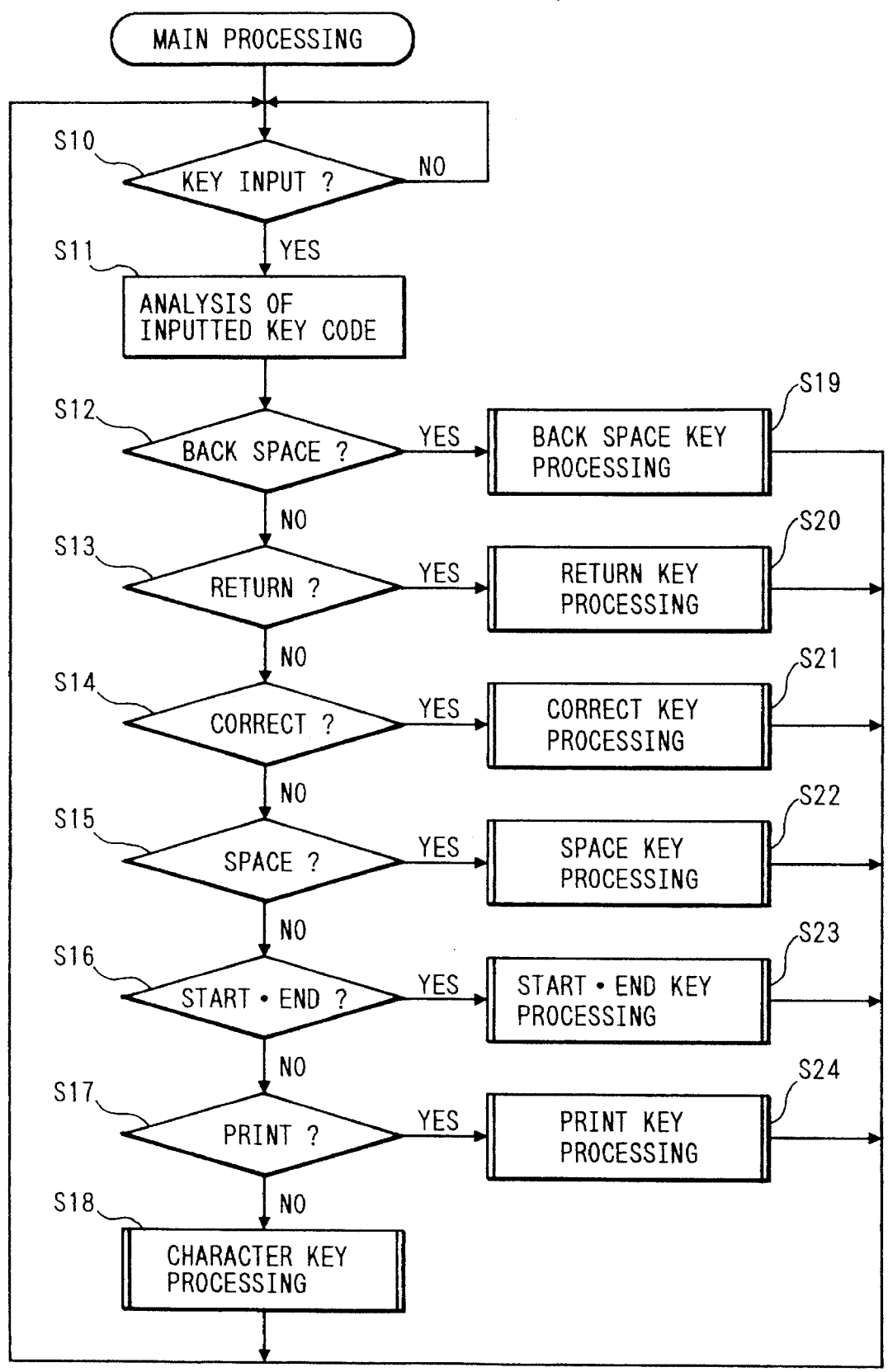
FIG. 7 is a flow chart of the control sequence of the embodiment.
Figure 8:
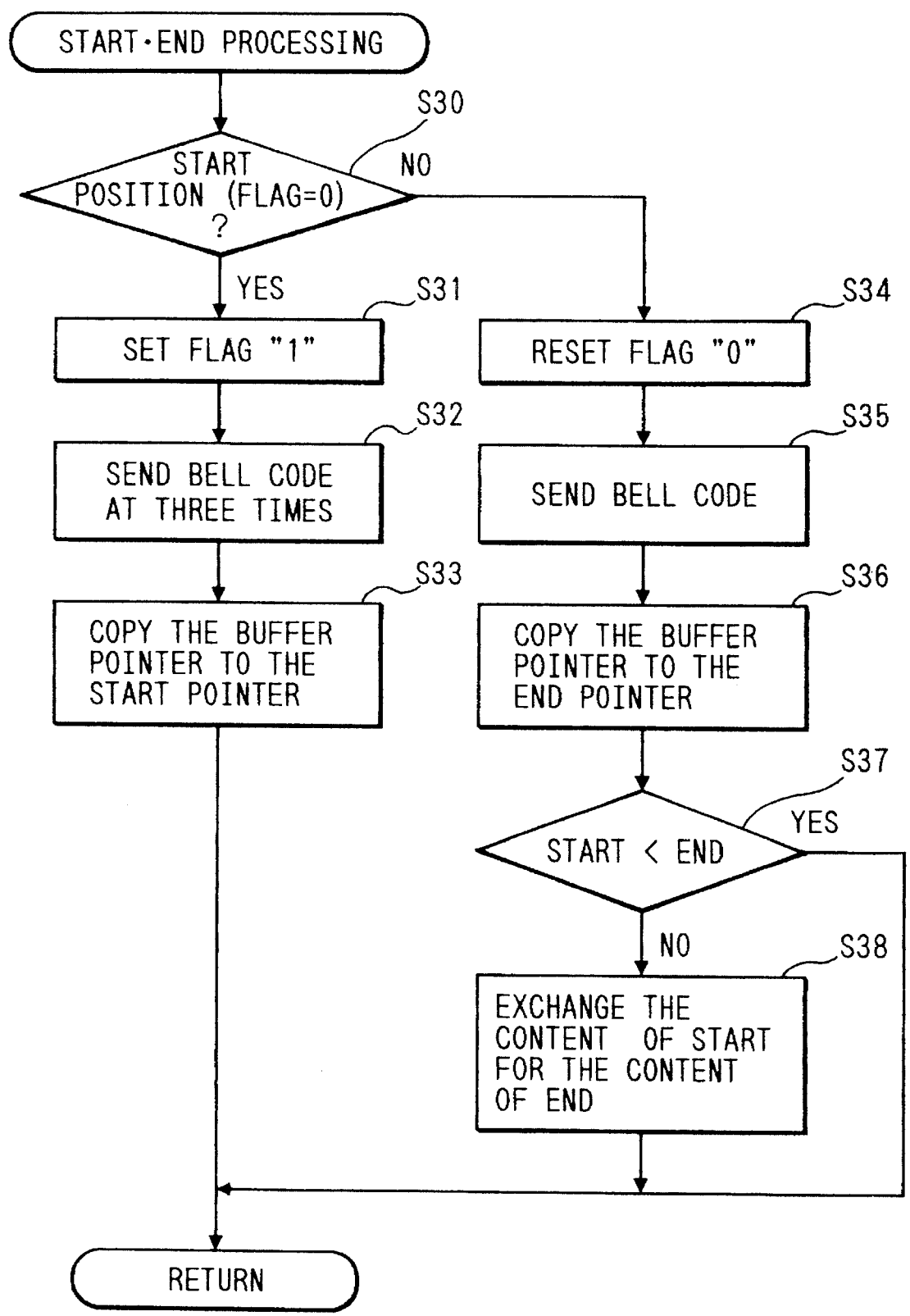
FIG. 8 is a flow chart of a control sequence for a start/end key in the embodiment.
Figure 9:
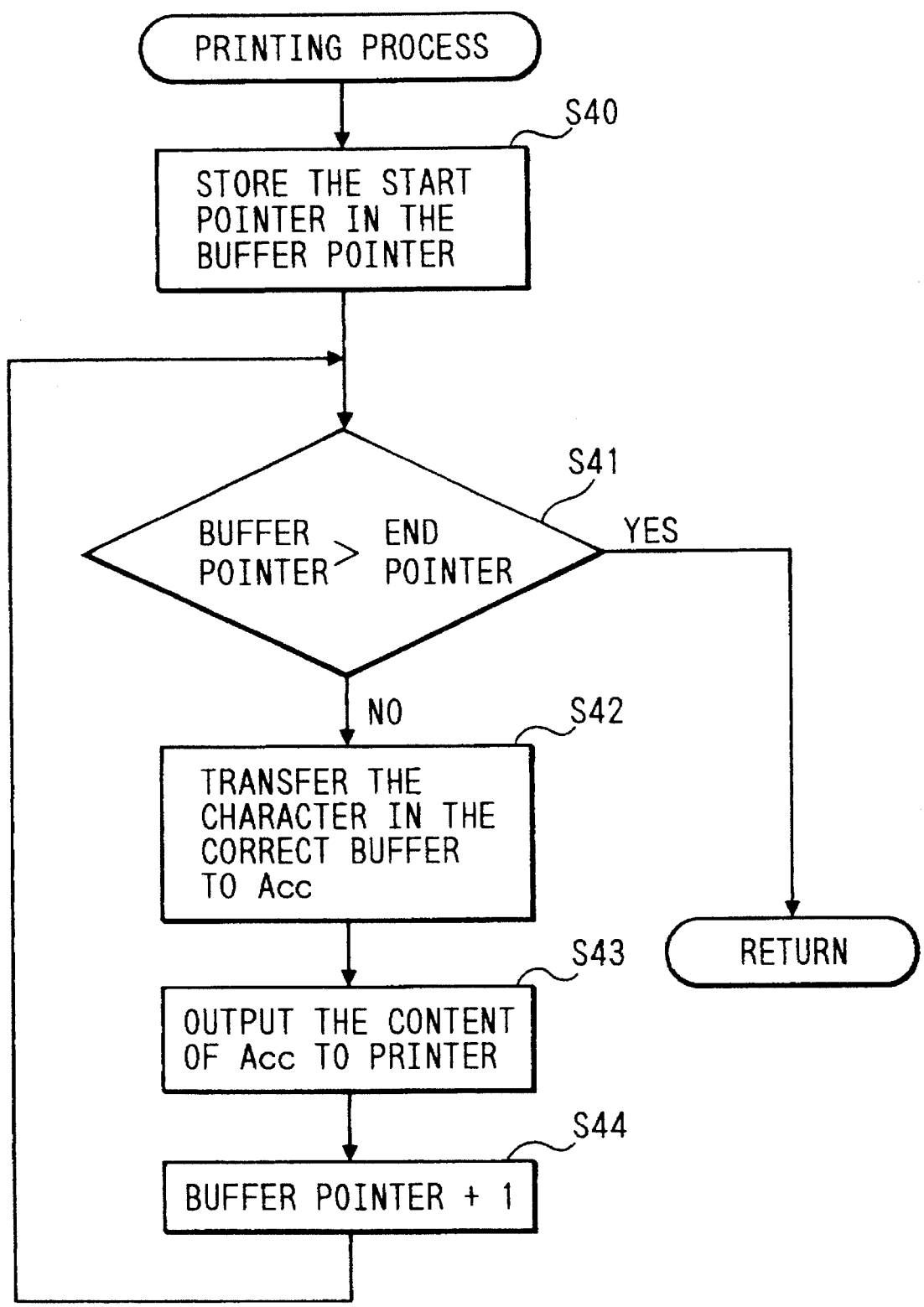
FIG. 9 is a flow chart of a control sequence for reprinting in the embodiment.

Mode of Control (FIGS. 7–9)

In the following there will be explained the mode of control of the electronic typewriter of the present embodiment, with reference to flow charts shown in FIGS. 7 to 9.

At first a step S10 awaits the actuation of one of the keys 10–16 of the keyboard 1 shown in FIG. 2, and, upon actuation, enters a key code corresponding to the actuated key from the keyboard 1. Then a step S11 analyzes the entered key code, and subsequent steps S12 to S17 discriminate the result of said analysis, thereby branching the processes. For example, if the back space key 11 is actuated, the sequence proceeds toga step S19 for decreasing the content of the buffer pointer 53 by one, and there is conducted control for positioning the carriage at a character at left of the current position. If a line feed code is present at left, there is conducted a control for positioning the carriage at a character at the right-hand end of the preceeding line. Such control can be easily achieved by searching the content of the correction buffer 50 and calculating the distance.

If the return key 13 is actuated, the sequence proceeds to a step S20, the carriage is returned to the left-hand end position of the next line, and a line feed code $(0D)_H$ is stored in the correction buffer 50. Similarly, if the correction key 14 is actuated, the Sequence proceeds to a step S21 for giving a correction command to the printer 3. The printed character is erased by printing a character corresponding to the content of the correction buffer 50 across the correction ribbon. At the same time, the content of the corresponding address of the correction buffer 50 is changed to a space code $(20)_H$. If the space bar 12 is actuated, a step S22 checks the content indicated by the buffer pointer 53, and, if the code of an already printed character is stored, moves the carriage to right and effects an increment of the buffer pointer 53. On the other hand, if a character is not yet printed, the space code $(20)_H$ is stored in the correction buffer 50, and there is effected an increment of the buffer pointer 53. If a character key 10 is actuated, the sequence proceeds to a step S18 for sending a corresponding character code to the printer 3, thereby printing a character. Subsequently the carriage is moved to right by a character. At the same time, in the correction buffer 50, a character code is stored in the memory address indicated by the buffer pointer 53, and there is conducted an increment of the buffer pointer 53. Though not illustrated in the drawing, it is also possible to move the carriage to a desired position by an index key or a reverse index key. When the index key is actuated, there is conducted a control for adding the number of characters in a line (21 in the present embodiment) to the content of the buffer pointer 53 and rotating the platen 40 in the forward direction, thereby positioning the carriage on a lower line next to the current line. If the reverse index key is actuated, there is conducted a control for subtracting the number of characters in a line (21 in the present embodiment) from the content of the buffer pointer 53 and rotating the platen 40 in the reverse direction, thereby positioning the carriage on an upper line next to the current one.

In the following there will be explained the control sequence when the start/end key 16 is actuated, with reference to a flow chart shown in FIG. 8, showing the details of a step S23 in FIG. 7.

At first a step S30 discriminates the state of the flag 54 shown in FIG. 6, for identifying the start position or the end position when the start/end key 16 is actuated. If the flag 54 is "0", there is identified a key operation indicating the start position and the sequence proceeds to a step S31 for setting the flag 54 to "1", thereby indicating that the start position has been determined. Then a step S32 sounds a buzzer three times, indicating the acceptance of the designation of the start position by the operator. This step is achieved by giving a bell code $(07)_H$ three times to the printer 3. Subsequently a step S33 stores the content of the buffer pointer 53 into the start pointer 51.

After the start position has been determined as explained above, the operator moves the carriage to a desired end position by means of the back space key 11, space bar 12 and return key 13. Then, when the start/end key 16 is actuated again, the step S30 discriminates the value of the flag 54. As it is "1" in this case, the key operation is identified to specify the end position, and the sequence proceeds to a step S34 for setting the flag 54 to "0" indicating that the end position has been determined. A succeeding step S35 sounds the buzzer once, informing the operator of the acceptance of designation of the end position. Then a step S36 stores the content of the buffer pointer 53 into the end pointer 52.

The normal control can be completed up to the step S36, but the present embodiment is further provided with additional control sequences of steps S37 and S38 for improving the operability, whereby a proper result can be obtained even if the start and end positions are designated in the inverted order.

Step S37 compares the magnitude of the start pointer 51 and the end pointer 52, and the control sequence is terminated if the former is smaller. However, if the former is larger, the step S38 exchanges the contents of the two pointers.

The printing operation of a designated range is conducted by the actuation of the print key 15 after the print range is determined as explained above. FIG. 9 is a flow chart showing the control sequence when the print key 15 is actuated, corresponding to the details of a step S24 in FIG. 7.

At first a step S40 stores the content of the start pointer 51 into the buffer pointer 53, which is used as a transient pointer for controlling the characters to be printed within the designated range. Then a step S41 discriminates whether the print control is to be terminated, by comparing the content of the buffer pointer 53 with that of the end pointer 52. If not, the sequence proceeds to a step S42 for reading the character code from a memory address indicated by the buffer pointer 53, and temporarily storing said character code in an accumulator Acc of the MPU 22. Then a step S43 sends the content of the accumulator Acc to the printer 3 through the printer port 21, thereby printing a character at a time.

A next step S44 effects an increment of the content of the buffer pointer 53, thereby preparing for the next printing operation. In this manner the contents from a memory address indicated by the start pointer 51 to a memory address indicated by the end pointer 52 are printed again.

Figure 10:
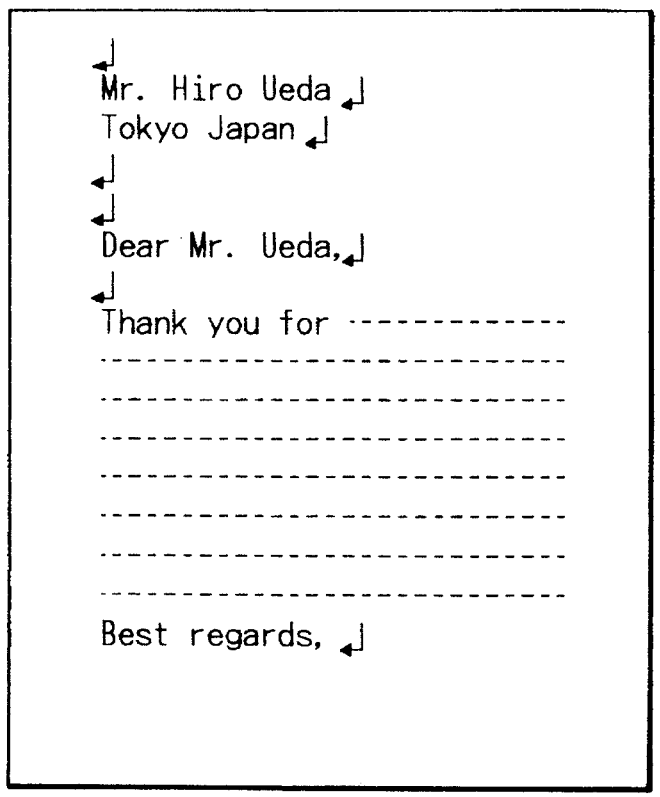
FIGS. 10 and 11 are views showing an application of the embodiment.

The feature of the present invention will become clearer from an application explained in the following. When a letter shown in FIG. 10 has been typewritten, the content of the correction buffer 50 corresponds, as shown in FIG. 5, to the content of the letter shown in FIG. 10. Then, in order to print the address on the envelope, the carriage is brought to a character "n" of the word "Japan" in the 2nd line, by means of the back space key 11.

In this state the content of the buffer pointer 53 is "25", and this value "25" is stored in the start pointer 51 as shown in FIG. 8, by actuating the start/end key 16. Then the carriage is moved to a character "M" of the word "Mr." in the 1st line. In this state the content of the buffer pointer 53 is "1". When the start/end key 16 is actuated, the value "1" is stored in the end pointer 52. However, since the contents of said pointers 51, 52 are mutually improper, the contents are mutually exchanged as explained above, whereby the start pointer 51 has a value "1" and the end pointer 52 has a value "25".

Figure 11:
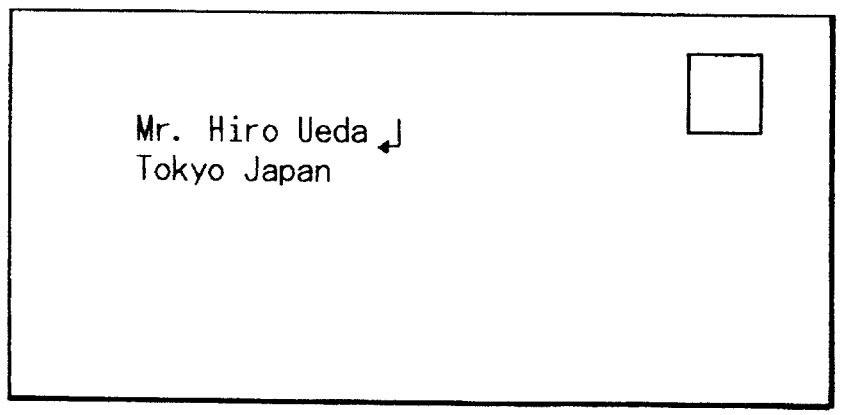

The preparations for re-printing are thus completed. Then the letter is removed from the platen 40 of the electronic typewriter, and an envelope is inserted. The address printing shown in FIG. 11 is achieved by actuating the pring key 15.

Such printing can be repeated any number of times, because it is conducted utilizing the buffer pointer 53 without changing the contents of the start pointer 51 and end pointer 52.

As explained in the foregoing, the present embodiment allows one to designate the range of re-printing, without a display device, by moving the carriage of the electronic typewriter to the start and end positions on the already printed paper, thereby realizing an inexpensive and convenient memory function.

Also the storage and retrieval of plural addresses or phrases are made possible in combination with the use of a non-volatile memory. Consequently the present invention has an extremely important advantage in practice and significantly improves the operating efficiency of the operator.

Furthermore, since the content of the correction buffer can be re-printed, a text without errors can be re-printed by designating the printing range after erasure or editing of characters.

Registration of Character Information to be Reprinted as a File

In the foregoing embodiment, the reprinting operation is conducted by the RAM1 shown in FIG. 3. However a convenient additional function can be obtained by the non-volatile memory RAM2.

Figure 12:
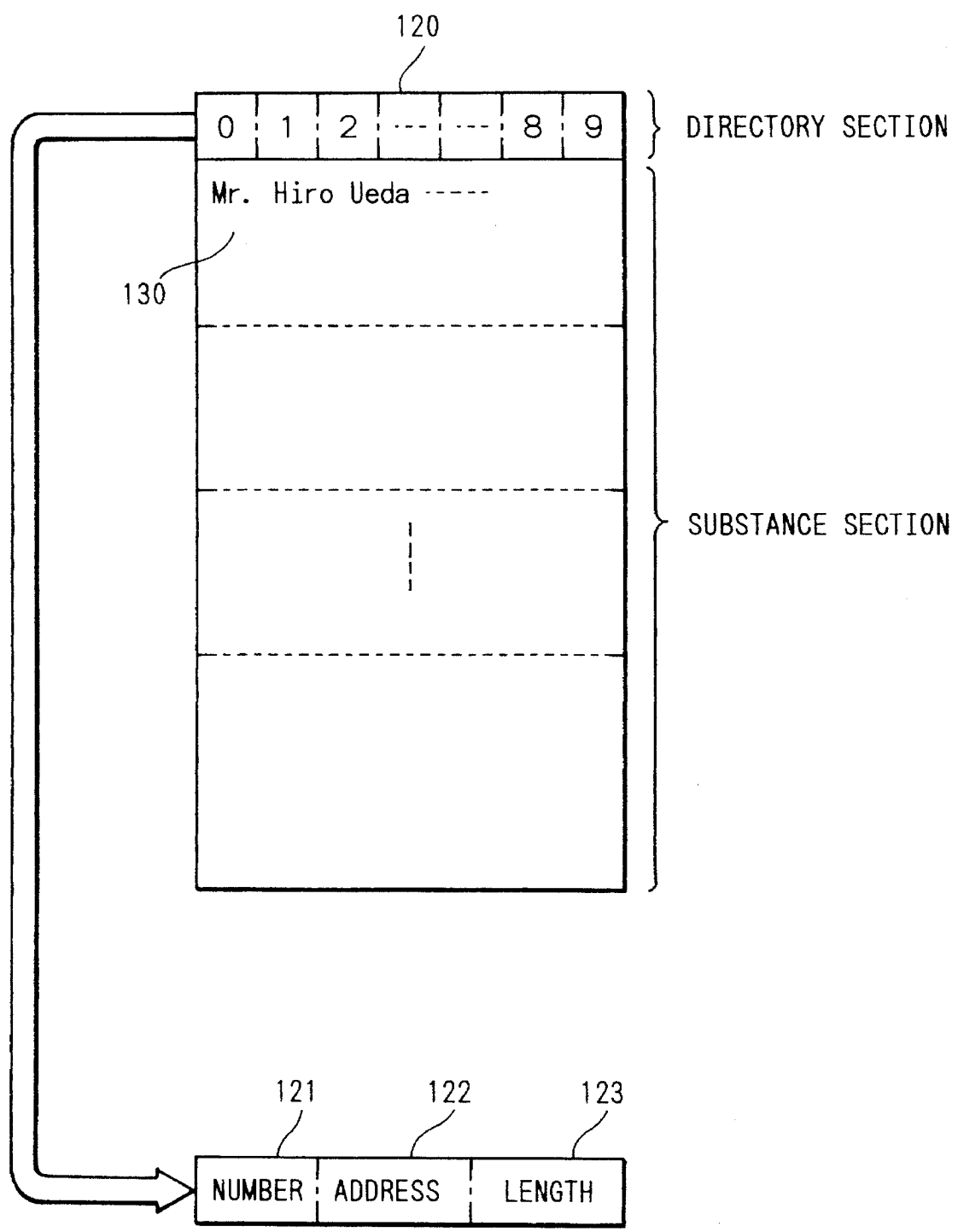
FIG. 12 is a view of another embodiment.

For example, as shown in FIG. 12, a directory area 120 and an actual data area 130 are formed as files in the RAM2. When the range of re-printing is fixed, the content of the correction buffer 50 is transferred to the actual data area 130, and a registration number 121, a memory address 122 and a length 123 of character train are stored in the directory area 120. In this manner there can be registered, for example, plural addresses.

Registration number 121 can be sequentially determined in automatic manner, or selected by the operator, and, the printing operation is conducted with the data corresponding to the number designated by the operator.

Printing with Ink Jet Printer

In the foregoing embodiments there has been employed a printer for printing a character by hitting the daisy wheel 43 with the hammer 42 thereby transferring the ink of the ink ribbon 44, but there may also be employed an ink jet printer for character printing.

Figure 13:
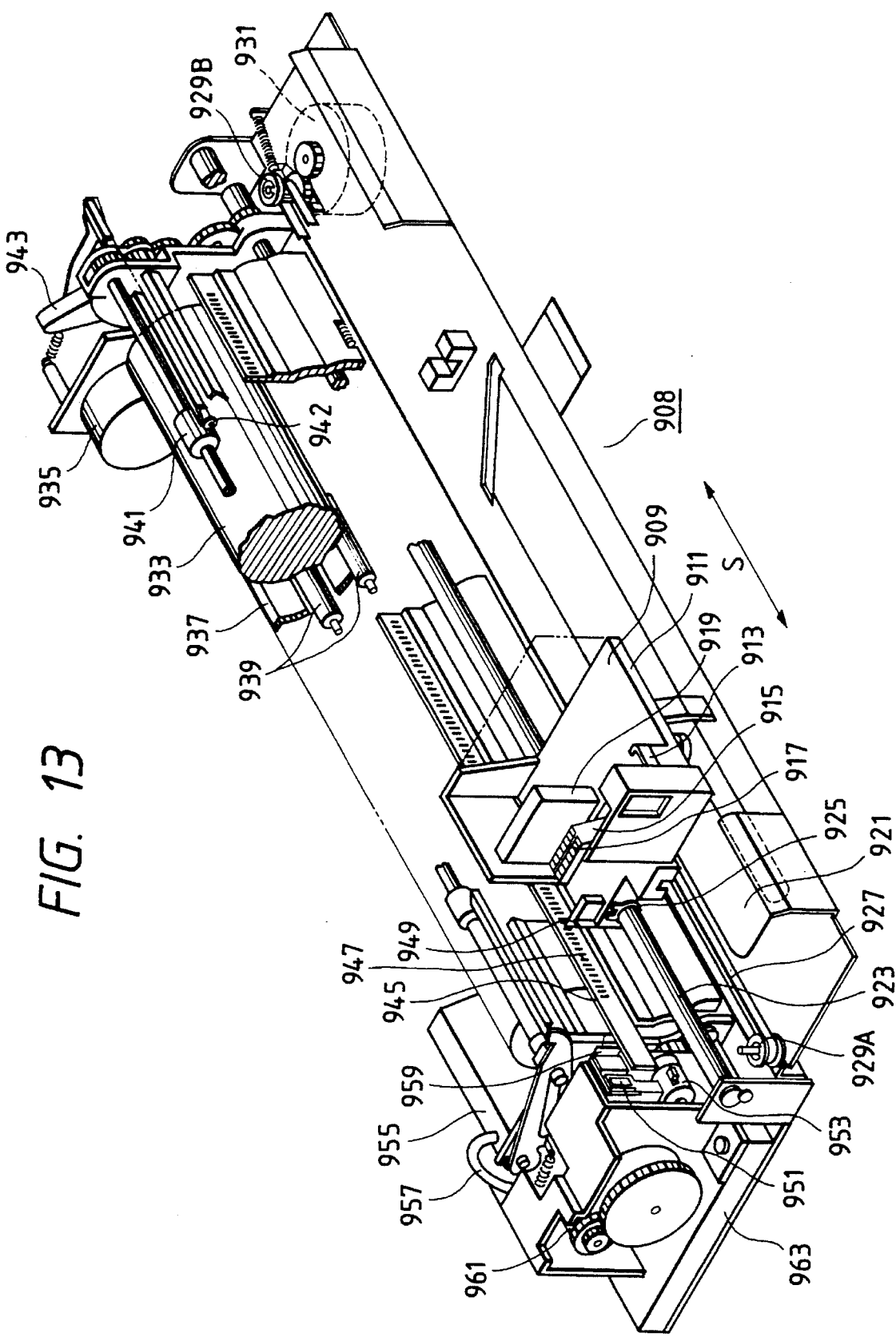
FIG. 13 is a perspective view showing the structure of an ink jet printer.

FIG. 13 shows an example of the structure of the ink jet printer.

There are shown a head cartridge 909 including an ink jet recording head; a carriage 911 supporting said head cartridge and movable in a direction S; a hook 913 for mounting the head cartridge 913 onto the carriage 911; a lever 915 for moving said hook 913, and provided with a marker 917 for indicating the print position of the recording head or other set positions on a scale provided on a cover; a supporting plate 919 for supporting an electrical connector for the head cartridge 909; and a flexible cable 921 connecting the electrical connector with a control unit of the main body.

There are further provided a guide shaft 923 inserted into a bearing 925 of the carriage 911 for guiding the carriage 911 in the direction S; and a timing belt 927 which is fixed to the carriage 911 for moving the carriage 911 in the direction S and is supported between pulleys 929A, 929B positioned on both ends of the apparatus, wherein the pulley 929B is driven by a carriage motor 931 through a transmission mechanism such as gears.

There are further provided a platen roller 933 for defining the position of recording surface of a recording medium (recording sheet) and driven by a motor 935 for transporting said recording medium at the recording operation; a paper pan 937 for guiding the recording medium from a paper tray to the recording position; feeding rollers 939 positioned in the feeding path of the recording medium for pressing the recording medium against the platen roller 933 thereby transporting said medium; a paper exhausting roller 941 provided in the downstream side of the recording position in the advancing direction of the recording medium, for forwarding the recording medium toward an un-represented exit; a spur 942 pressed to said paper exhausting roller 941 across the recording medium thereby transporting the medium; and a release lever 943 for releasing the feed rollers 939, presser plate 945 and spur 942 from the biased positions thereof for example at the setting of the recording medium.

A presser plate 945 is provided for pressing the recording medium and maintaining the same in contact with the platen roller 933, in the vicinity of the recording position. In the present embodiment, there is employed an ink jet recording head for recording by ink discharge. The presence of the presser plate 945 is effective, because the distance between the plane of ink discharge apertures of the recording head and the recording surface of the recording medium is relatively small and has to be strictly controlled in order to avoid mutual contact. A scale 947 provided on the presser plate 945 and a marker 949 provided on the carriage 911 allow to read the print position of the recording head and other set positions.

A cap member 951 composed of an elastic material, such as rubber, is provided at a home position so as to oppose to the ink discharge face of the recording head and is supported in attach/detachable manner to or from the recording head. Cap member 951 is used for protecting the recording head in non-recording state, or for the recovery of ink discharge of the recording head. The discharge recovery is to remove the factors of discharge failure such as bubbles, dusts or viscosified ink unsuitable for recording, by activating the energy generating elements provided inside the ink discharge apertures thereby discharging the ink from all the discharge apertures of the recording head, or by discharging the ink from the apertures in forced manner.

There are further provided a pump 953 for applying a suction force for the forced ink discharge and for sucking the ink received in the cap member 951 at the discharge recovery by such forced discharge or at the discharge recovery by preliminary ink discharge; a waste ink reservoir 955 for holding the waste ink sucked by the pump 953; a tube 957 connecting the pump 953 with the waste ink reservoir 955; a blade 959 for wiping the ink discharge face of the recording head, movably supported between an advanced position for wiping the recording head in the course of movement thereof and a retracted position not engaging with the ink discharge face; a motor 961 for the recovery system; and a cam mechanism 963 for moving the pump 953, cap member 951 and blade 959 by means of the motor 961.

The correction with the ink jet printer is possible for example by overlaid discharge of white ink.

The input operation of the keyboard 1 and the control of the memories are same as in the foregoing embodiments.

The reverse rotation of the platen in the present embodiment is conducted, for example, only after the lapse of 10 seconds from the printing operation, since the ink drying requires a certain time in case of the ink jet printer.

What is claimed is:

1. An output apparatus comprising:

print means for printing characters;

memory means for storing character information representing printed characters, the character information stored in said memory means being sequentially updated in response to the input from a keyboard;

selection means for selecting a part of said character information of at least a character stored in said memory means by instructing the selection of a start point and an end point of the character information;

position instruction means for instructing the selection of a desired position on a print medium at which the selected part of said character information is to be printed;

instruction means for instructing printing at the instructed position of the selected part of said character information; and print control means for controlling said print means so as to read out and print the selected part of said character information from said memory means without storing the selected part thereof in said memory means, in accordance with the printing instruction by said instruction means.

2. An output apparatus according to claim 1, wherein said part, selected by said selection means, of said character information is stored in non-volatile memory means.

3. An output apparatus according to claim 1, wherein said selection means further comprises determining means for independently determining the start point and the end point of a text to be selected.

4. An output apparatus according to claim 3, wherein said determination of the start and end points by said determining means is conducted by a particular key.

5. An output apparatus according to claim 3, further comprising:

exchange means responsive to said comparator means for exchanging the start and end points if said comparator means identifies that said start point is positioned behind said end point.

6. An output apparatus according to claim 3, wherein said determining means is adapted to determine the start and end points, on said character information printed by said print means.

7. An output apparatus according to claim 2, wherein said non-volatile memory means is adapted to store a plurality of said part of character information, each with a registration number.

8. An output apparatus comprising:

print means for printing characters;

retaining means for retaining input character data as data for erasure, the input data retained in said retaining means being sequentially updated in response to the input from a keyboard;

a liquid jet recording head having a liquid storage member and at least a single thermal element to heat liquid within the liquid storage member for forming a droplet of the liquid to be ejected from said head upon activation and consequent heating of the single thermal element by application thereto of drive signal pulses;

designation means for designating desired character data within the character data retained by said retaining means;

position instruction means for instructing the selection of a desired position on a print medium at which the desired character data is to be printed;

printing instruction means for instructing printing of the designated character data; and control means for controlling said recording head so as to read out and print the designated character data from said retaining means without retaining the designated character data in said retaining means at the position instructed by said position instruction means in response to instructions from said printing instruction means.

9. An output apparatus according to claim 8, wherein said character data, designated by said designation means, are stored in non-volatile memory means.

10. An output apparatus according to claim 8, wherein said designation means comprises means for independently determining the start point and the end point of character data to be designated.

11. An output apparatus according to claim 10, wherein said determining means is adapted to determine the start and end points, on said character data printed by said recording head.

12. A method of outputting information comprising the steps of:

printing characters inputted from a keyboard;

storing character information used for inputted printed characters, in such a manner that the stored character information is sequentially updated in response to the input from said keyboard;

selecting a part of the character information of at least a character stored in said storing step by instructing the selection of a start point and an end point of the character information;

instructing the selecting of a desired position on a print medium at which the selected part of character information is to be printed;

instructing printing at the instructed position of the selected part of the character information; and controlling the operation in said printing step so as to read out and print the selected part of the character information stored in said storing step without storing the read out selected part of the character information in accordance with the printing instruction in said printing instruction step.

13. An output method according to claim 12, further comprising the step of storing the part of the character information selected in said selecting step, in non-volatile memory.

14. An output method according to claim 13, wherein said non-volatile memory storing step stores a plurality of parts of character information, each with a registration number.

15. An output method according to claim 12, wherein said selecting step further comprises the step of independently determining the start point and the end point of a text to be selected.

16. An output method according to claim 15, wherein said determining step is performed by actuating a particular key of a keyboard.

17. An output method according to claim 15, further comprising the step of:

exchanging the start and end points if said comparing step determines that the start point is positioned behind the end point.

18. An output method according to claim 15, wherein said determining step comprises the step of determining the start and end points of the character information printed in said printing step.

19. A method of outputting information, comprising the steps of:

printing characters;

retaining input character data as data for erasure of printed characters in such a manner that the retained character data is sequentially updated in response to the input from a keyboard;

forming a droplet of the liquid to be ejected from a liquid jet recording head upon activation and consequent heating of at least a single thermal element, to heat liquid within a liquid storage member contained in the liquid jet recording head, by the application to the thermal element of drive signal pulses;

designating desired character data within the character data retained in said retaining step;

instructing printing of the designated character data;

instructing the selecting of a desired position on a print medium at which the desired character data is to be printed; and controlling the recording head so as to read out and print the designated character data from the input character data stored in said retaining step without retaining the read designated character data, at the position instructed in said step for instructing the desired position in response to instructions instructed in said printing instructing step.

20. An output method according to claim 19, further comprising the steps of storing character data, designated in said designating step, in a non-volatile memory.

21. An output method according to claim 19, wherein said designating step comprises the step of independently determining the start and the end point of character data to be designated.

22. An output method according to claim 21, wherein determining step comprises the step of determining the start and end points of character data printed by the recording head.

23. An output apparatus according to claim 1, wherein said output apparatus further includes comparator means for comparing a magnitude of a value of the start point with that of the end point.

24. A method of outputting information according to claim 12, wherein said method further includes the step of comparing a magnitude of a value of the start point with that of the end point.

* * * * *